Jan. 6, 1953 J. DI BARI 2,624,651
REVOLVING TRAY FOR WHISKEY BOTTLES AND GLASSES
Filed June 29, 1949 2 SHEETS—SHEET 1
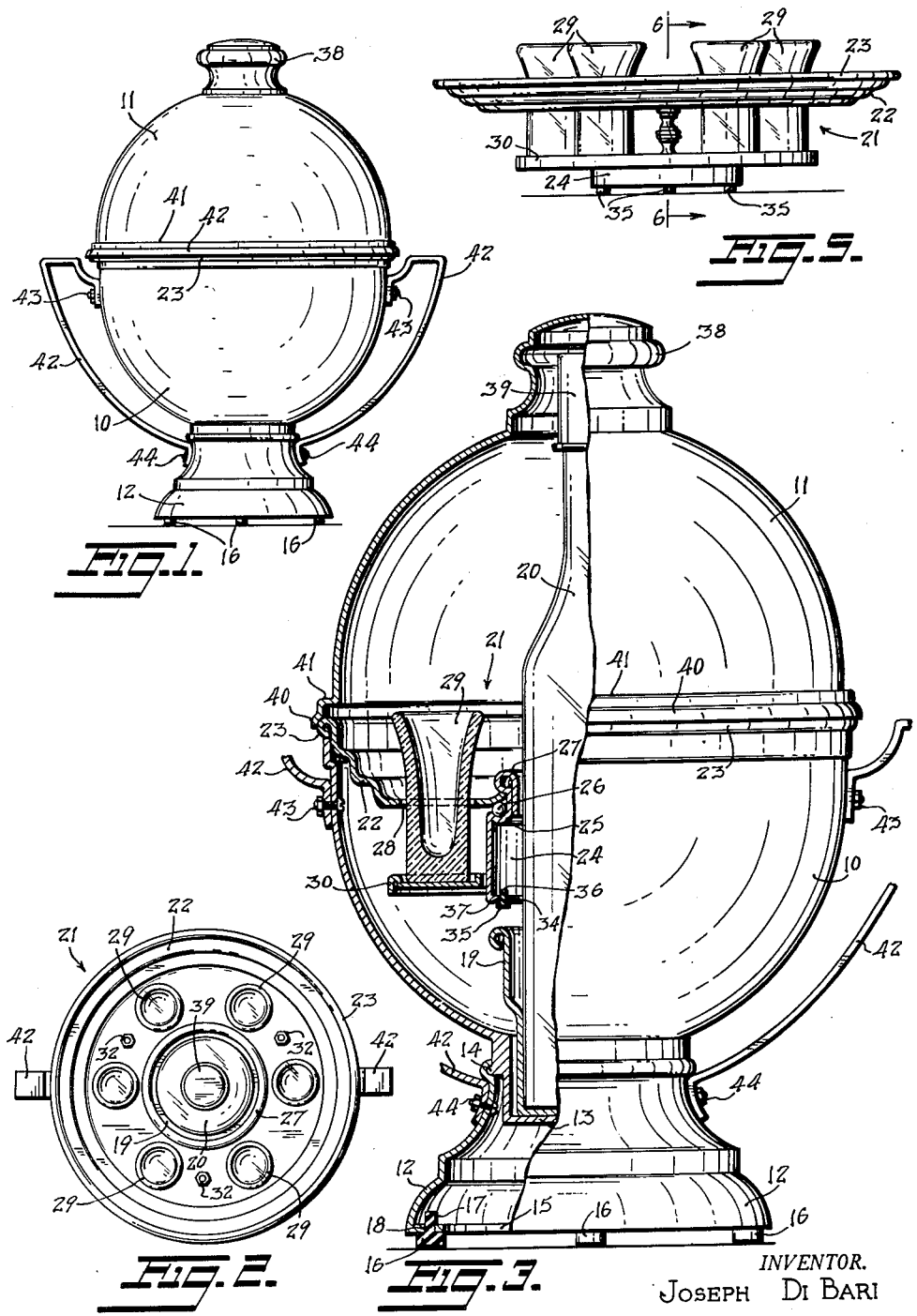
INVENTOR.
JOSEPH DI BARI
BY
ATTORNEY Jan. 6, 1953 J. DI BARI 2,624,651
REVOLVING TRAY FOR WHISKEY BOTTLES AND GLASSES
Filed June 29, 1949 2 SHEETS—SHEET 2
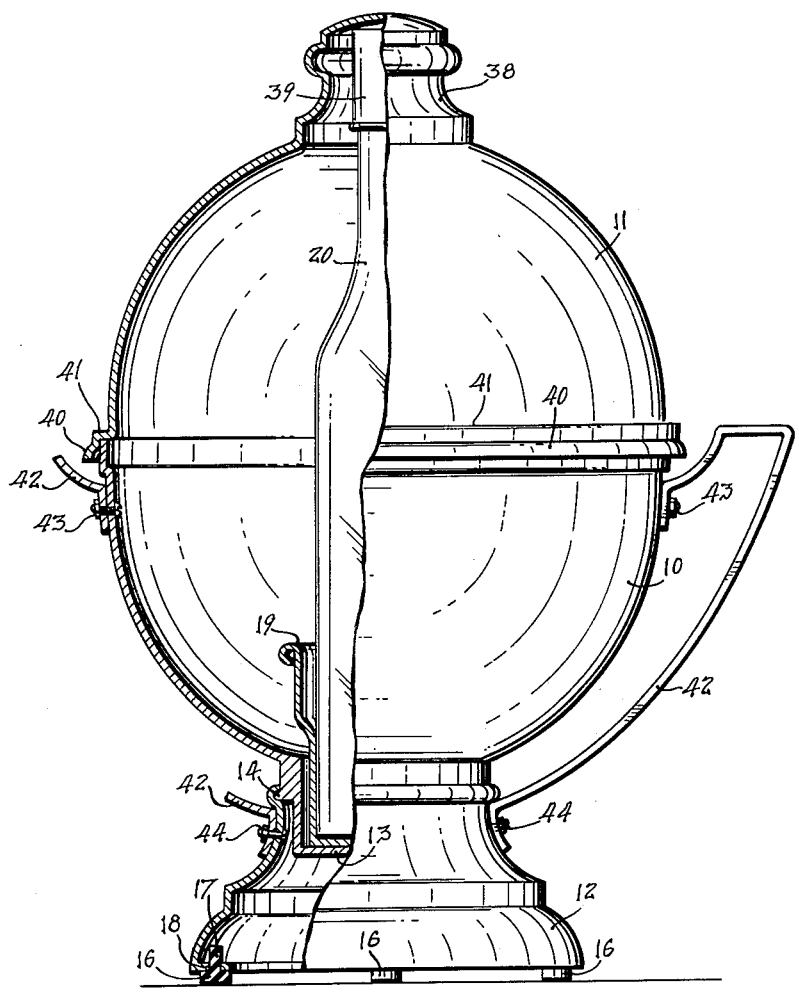
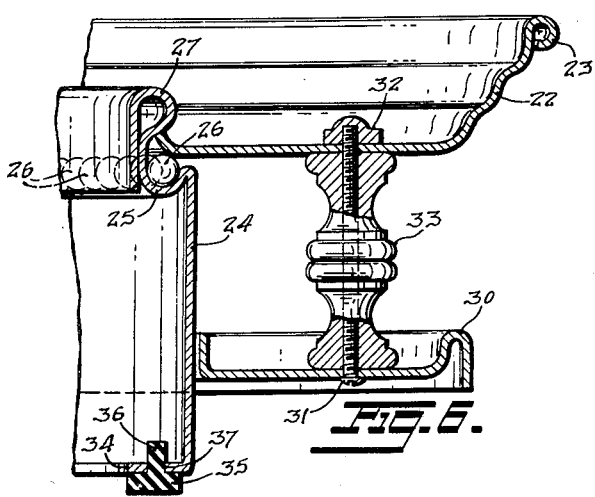
INVENTOR.
JOSEPH DI BARI
BY
ATTORNEY Patented Jan. 6, 1953

2,624,651

UNITED STATES PATENT OFFICE 2,624,651

REVOLVING TRAY FOR WHISKEY BOTTLES AND GLASSES

Joseph Di Bari, Brooklyn, N. Y.

Application June 29, 1949, Serial No. 102,063

3 Claims. (Cl. 312—351)

This invention relates to new and useful improvements in a holder for glasses and a bottle.

More particularly, the present invention proposes the construction of a holder for glasses and a bottle characterized by a bottom receptable and a cover for closing the open top of the bottom receptacle in a manner to contain a bottle of liquid and a rotatable tray having a plurality of glasses mounted thereon.

Another object of the present invention proposes constructing the holder so that when the cover is removed the tray may be lifted out of the bottom receptacle and placed upon a flat surface in a manner to be rotated to a desired position to conveniently extend one of its full glasses to be removed from the tray.

Still further, the present invention proposes forming the bottom receptacle with a recessed portion in which a cup-shaped member is received and into which the bottle is positioned and which cup-shaped member is of a diameter less than the diameter of the recessed portion but extended a considerable distance out of the top of the recessed portion in a manner so that ice can be packed into the bottom of the receptacle about the cup-shaped member to chill the contents of the bottle.

The present invention further proposes forming the rotatable tray of a sleeve engaged about the bottle with a tray member rotatably mounted on the top portion of the sleeve and having its outer periphery rested on the top edge of the bottom receptacle and formed with a plurality of holes in which glasses are mounted in a manner so that when the tray is removed from the holder it can be rested on the bottom of the sleeve permitting the tray member to be freely rotated relative thereto.

A further object of the present invention proposes forming the sleeve with a race containing ball bearings engaged by the inner periphery of the tray member in a manner so that the tray member can be freely rotated relative to the sleeve.

Still another object of the present invention proposes supporting a shelf member from said tray member and about the sleeve in a manner so that the bottoms of the glasses passed through the holes in the tray member will be rested on the top face of the shelf member.

The present invention further proposes arranging the cover so that it will seal the open top of the bottom receptacle whether or not the rotatable tray is mounted in position on the bottom receptacle in a manner to seal the interior of the holder to function as a refrigerator for the liquid contained in the bottle positioned in the holder.

It is a further object of the present invention to construct a holder for glasses and a bottle which is attractive and ornamental, which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of the holder for glasses and a bottle constructed in accordance with the present invention.

Fig. 2 is a plan view of Fig. 1, but with the top cover removed.

Fig. 3 is an enlarged view similar to Fig. 1, but with a portion thereof broken away to reveal interior constructions.

Fig. 4 is a view similar to Fig. 3, but with the rotatable tray removed.

Fig. 5 is a side elevational view of the tray, per se.

Fig. 6 is an enlarged partial vertical sectional view of the tray taken on the line 6—6 of Fig. 5.

The holder for glasses and a bottle, according to the present invention, includes a bottom receptacle 10 and a top cover 11. Both the receptacle 10 and the top cover 11 are formed of metal and preferably of spun aluminum and combine to form substantially an oval with its greatest dimension extended in the height.

The bottom receptacle 10 is mounted on a base 12 formed of the same metal used for forming the receptacle. The receptacle 10 is formed with a recessed portion 13 extended downward into the base. The side wall of the recessed portion 13 is formed with a circular bead 14 and the top portion of the base 12 is bent about the bead securely connecting the base 12 to the recessed portion 13 and more particularly to the bottom receptacle 10. The base 12 is hollow and is formed at its bottom with an inwardly directed flange 15 provided with non-marring feet 16. The feet 16 are preferably formed of rubber and have upstanding portions 17 frictionally extended through complementary holes 18 formed in the flange 15 connecting the feet 16 to the flange 15.

Received within the recessed portion 13 there is a cup-shaped member 19 in which the bottom of a bottle 20 is positioned. The cup-shaped member 19 has an external diameter slightly less than the inside diameter of the recessed portion 13 but extends a considerable distance above the recessed portion into the bottom receptacle 10. This permits ice to be packed about the cup-shaped member 19 within the receptacle 10 to chill the contents of the bottle 20. The water from the melting ice packed about the cup-shaped member 19 will filter down into the space between the recessed portion 13 and the cup-shaped member to aid in more quickly cooling the liquid contents of the bottle 20.

Nested in the top portion of the bottom receptacle 10, about the bottle 20, there is a rotatable tray 21. The rotatable tray 21 is characterized by a tray member 22 which is downwardly dished and formed about its outer periphery with a bead 23 arranged to rest on the top edge of the bottom receptacle 10 and to extend slightly beyond the outer circumference of the bottom receptacle 10, as clearly shown in Fig. 3. The tray member 22 is formed with a central opening through which a sleeve 24 extends. The sleeve 24 is of a diameter so that the bottle 20 extends therethrough, see Fig. 3. Adjacent its top, the sleeve 24 is formed with a semi-circular race 25 in which a plurality of ball bearings 26 are disposed.

The inner periphery of the tray member 22 rests on the ball bearings 26 above the race 25 and the top of the sleeve is formed with a bead 27 which engages on the top face of the tray member 22 and holds the tray member in position on ball bearings 26. Thus, the tray member 22 is free to be rotated relative to the sleeve 24 on the ball bearings 26 which serve as casters to permit easier rotation of the tray member.

The tray member 22 is formed with a plurality of equally spaced holes 28 through which the bottom portions of the glasses 29 are extended. The bottom ends of the glasses 29 rest on the top face of a shelf member 30, as clearly shown in Fig. 3. The shelf member 30 is disposed about the bottle 20 and supported from the tray member 22 to rotate therewith relative to the sleeve 24. The shelf 30 is supported from the tray member 22 by means of a plurality of long bolts 31, see especially Fig. 6, projected through aligned openings formed in the shelf member and the tray member and threaded into nuts 32 on the top face of the tray member 22. The nuts and bolts are positioned between certain of the glasses 29 and artistic tubular posts 33 are positioned on the bolts 31 between the adjacent faces of the tray member 22 and the shelf member 30 for supporting the shelf member at a fixed position beneath the tray member 22.

The bottom of the sleeve 24 is formed with an inwardly directed flange 34 upon which non-marring feet 35 are mounted. As in the case of the feet 16, the feet 35 are formed of rubber and have upstanding portions 36 frictionally extended through complementary holes 37 formed in the flange 34, see Fig. 6. When the tray 21 is removed from the holder, as shown in Fig. 5, the feet 35 are adapted to be rested on a flat surface so that the tray member 22 together with the shelf member 30 can be rotated relative to the sleeve 24, on the ball bearings 26, to project a filled glass 29 to be conveniently removed from the tray.

The cover 11 is formed at its top with a hollow top dome portion 38. The top of the bottle 20 is closed by a metallic cap 39 which is projected upward into the dome portion, as shown in Figs. 3 and 4. The cap 39 when removed from the top of the bottle 20 may also be used for drinking purposes, if desired.

The bottom periphery of the cover 11 is formed with a pair of concentric shoulders 40 and 41. When the tray 21 is in position in the bottom receptacle 10, the shoulder 40 is rested on the periphery of the bead 23. However, when the tray 21 is removed from the holder, as shown in Fig. 4, then the top shoulder 41 is rested on the top edge of the bottom receptacle 10. Thus, the cover 11 acts to seal the interior of the holder whether or not the tray 21 is in position in the bottom receptacle 10.

Diametrically opposite sides of the holder are formed with handles 42. The top ends of the handles 42 are secured to the sides of the bottom receptacle 10 below the top edges thereof by means of nut and bolt assemblies 43 and the bottom ends of the handles are secured to the base 12 by means of nut and bolt assemblies 44.

From the foregoing it will be apparent that a novel holder has been provided which will contain both a bottle 20 of liquid and a rotatable tray of glasses so that both the contents of the bottle 20 and the glasses 29 will be chilled so that the cooled liquid will not be warm when it is poured into the glasses 29 to be drunk. When the tray 21 is removed and the glasses 29 filled, the tray member 22 may be partially rotated relative to the sleeve 24, following the removal of each glass, to bring the next filled glass into a position in which it can be conveniently removed from the tray member.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A holder for glasses and a bottle comprising a base, a bottom receptacle mounted on said base and having a recessed portion extended into said base for receiving the bottom of a bottle to position the same concentrically of said receptacle, a tray for engagement about the bottle and having its outer periphery resting on the upper edge of said bottom receptacle and extending slightly beyond the outer circumference of the upper edge of said bottom receptacle, and a top cover for engagement over the top of the bottle and having its peripheral edges resting on the peripheral edges of said tray.

2. A holder for glasses and a bottle comprising a base, a bottom receptacle mounted on said base and having a recessed portion extended into said base for receiving the bottom of a bottle to position the same concentrically of said receptacle, a tray for engagement about the bottle and having its outer periphery resting on the upper edge of said bottom receptacle and extending slightly beyond the outer circumference of the upper edge of said bottom receptacle, and a top cover for engagement over the top of the bottle and having a plurality of concentric shoulders, the first and outer most of said shoulders being arranged to engage the outer periphery of said tray and the other of said shoulders being arranged to engage the upper edge of said bottom receptacle when said tray is removed from said bottom receptacle.

3. A rotatable tray comprising a sleeve, an inwardly directed flange about the bottom edge of said sleeve, an upwardly opening race formed in and near the top edge of said sleeve, ball bearings in said race, a tray member engaged about said sleeve and having its inner periphery resting on said ball bearings and being formed with spaced holes for glasses, a shelf member engaged about said sleeve beneath said tray member to have glasses rest thereon and supported from said tray member to rotate with said tray member relative to said sleeve and on said ball bearings, and an outwardly extended bead on the top edge of said sleeve and resting on the top face of said tray member holding the same in engagement with said ball bearings.

JOSEPH DI BARI.

REFERENCES CITED

The following references are of record in the file of this patent:

UNITED STATES PATENTS

| Number | Name | Date |
|---|---|---|
| 1,400,145 | Duncan | Dec. 13, 1921 |
| 2,141,001 | Horsley | Dec. 20, 1938 |
| 2,494,289 | Di Bari | Jan. 10, 1950 |